United States Patent
Landis et al.

(10) Patent No.: US 6,881,346 B2
(45) Date of Patent: Apr. 19, 2005

(54) METHODS OF TREATING PHOSPHATE IN A BODY OF WATER

(75) Inventors: Charles R. Landis, Littleton, CO (US); Steven R. Gray, Highlands Ranch, CO (US)

(73) Assignee: Halliburton Energy Services, Inc., Duncan, OK (US)

(*) Notice: Subject to any disclaimer, the term of this patent is extended or adjusted under 35 U.S.C. 154(b) by 215 days.

(21) Appl. No.: 10/278,955

(22) Filed: Oct. 23, 2002

(65) Prior Publication Data

US 2003/0213753 A1 Nov. 20, 2003

Related U.S. Application Data

(63) Continuation-in-part of application No. 10/146,966, filed on May 16, 2002.

(51) Int. Cl.$^7$ ................................................. C02F 1/58
(52) U.S. Cl. .................. 210/667; 210/683; 210/714; 210/728; 210/747; 210/764; 210/906; 252/176; 252/181; 504/152
(58) Field of Search ............................ 210/665–667, 210/714, 724, 725, 728, 730, 731, 732, 734, 747, 906, 683, 764; 252/175, 176, 180, 181; 504/152

(56) References Cited

U.S. PATENT DOCUMENTS

| | | | |
|---|---|---|---|
| 2,345,827 A | | 4/1944 | Olin ........................ 210/23 |
| 2,531,451 A | | 11/1950 | Maier ....................... 210/23 |
| 3,453,207 A | | 7/1969 | Eck et al. .................. 210/49 |
| 3,456,796 A | | 7/1969 | Eck et al. .................. 210/49 |
| 3,506,570 A | | 4/1970 | Wukasch .................... 210/49 |
| 3,697,233 A | | 10/1972 | Peck ........................ 23/293 |
| 3,872,204 A | | 3/1975 | Yano et al. ................. 264/102 |
| 3,930,834 A | * | 1/1976 | Schulteis et al. ........... 504/152 |
| 4,080,290 A | | 3/1978 | Klantschi et al. .......... 210/37 R |
| 4,415,467 A | * | 11/1983 | Piepho ..................... 252/181 |
| 4,507,206 A | * | 3/1985 | Hughes ..................... 210/709 |
| 4,765,908 A | * | 8/1988 | Monick et al. ............. 210/666 |
| 4,877,524 A | * | 10/1989 | Eberhardt ................ 210/242.1 |
| 4,880,547 A | | 11/1989 | Etani | |
| 5,023,012 A | * | 6/1991 | Buchan et al. .............. 252/181 |
| 5,039,427 A | | 8/1991 | Conover ..................... 210/702 |
| 5,457,272 A | | 10/1995 | Hooykaas ................... 588/250 |
| 5,486,499 A | | 1/1996 | Davies et al. ............... 502/81 |
| 5,681,475 A | * | 10/1997 | Lamensdorf et al. ......... 210/666 |
| 5,917,069 A | | 6/1999 | Buckl et al. ................ 554/193 |
| 6,069,113 A | * | 5/2000 | Kierzkowski et al. ........ 504/152 |
| 6,165,369 A | | 12/2000 | Tanis et al. ................. 210/705 |
| 6,350,383 B1 | | 2/2002 | Douglas .................... 210/679 |
| 6,383,398 B1 | * | 5/2002 | Amer ....................... 210/710 |
| 6,447,686 B1 | | 9/2002 | Choi et al. ................. 210/666 |
| 2003/0213752 A1 | | 11/2003 | Landis et al. .............. 210/723 |

FOREIGN PATENT DOCUMENTS

| | | | | |
|---|---|---|---|---|
| EP | 0 066 421 A1 | 12/1982 | ............ | C02F/1/82 |
| EP | 0 620 190 A1 | 10/1991 | ............ | C02F/1/52 |
| EP | 0 620 190 | 10/1994 | ............ | C02F/1/52 |
| JP | S51-43334 | 4/1976 | | |
| JP | S52-126065 | 10/1977 | ............ | C02C/5/02 |
| WO | WO 92/08533 | 5/1992 | ............ | B01D/17/02 |
| WO | WO 00/27755 | 5/2000 | ............ | C02F/1/28 |
| WO | WO 03/097538 A1 | 11/2003 | ............ | C02F/1/68 |
| WO | WO 2004/037729 A1 | 5/2004 | ............ | C02F/1/52 |

OTHER PUBLICATIONS

Abstract No. JP 54041924 A dated Apr. 3, 1979, entitled Lightweight Inorganic Aggregate Made by Thermal Foaming—from Alum, Slaked Lime, Alkali Borate, Phosphate or Aluminum Hydroxide Added to Siliceous Material, Bentonite and Alkali Silicate.

* cited by examiner

Primary Examiner—Peter A. Hruskoci
(74) Attorney, Agent, or Firm—Craig W. Roddy; Haynes And Boone, LLP

(57) ABSTRACT

Compositions including alum, a smectite material and optionally one or more of a buffer and an algaecide coating or additives for the clarification of bodies of water by removal of dissolved solids, dissolved organic materials and other anions such as fluoride and chloride as well as the removal of total phosphorus from such bodies of water. The compositions are designed to be delivered to concentrated or impounded phosphorus located at the bottom of various bodies of water and may be produced in various physical forms.

44 Claims, No Drawings

METHODS OF TREATING PHOSPHATE IN A BODY OF WATER

CROSS-REFERENCE TO RELATED APPLICATIONS

This application is a continuation-in-part of copending U.S. patent application Ser. No. 10/146,966 filed May 16, 2002, the entire disclosure of which is incorporated herein by reference.

BACKGROUND

The present embodiment relates generally to the production of water treatment compositions for the clarification of bodies of water by removal of dissolved solids, dissolved organic materials (i.e. natural pigments and humic acids) and other anions such as fluoride and chloride as well as the removal of total phosphorus from such bodies of water. More particularly, the compositions are designed to be delivered to concentrated or impounded total phosphorus located at the bottom of various bodies of water and may be produced in a variety of physical forms that are designed to enhance the delivery of the compositions to a desired location in a body of water such as pellets, tablets and extruded noodles, briquettes or ribbons. The compositions include alum and a smectite mineral-bearing industrial material such as bentonite (montmorillonite), attapulgite, saponite, hectorite, sepiolite and fullers earth. The compositions optionally include one or more of a buffer and algaecide coatings or additives. The compositions can be delivered to a wide range of locations in bodies of water including the "sediment water interface" which is an area that can be generally defined as the top six inches of sediment combined with the deepest six inches of water. Even more particularly, the compositions are designed so that when they are dropped through a body of water, the alum is released when the pellet reaches a desired location in the water, thereby treating the phosphorus more efficiently and using or consuming less alum.

Acidic metal salt and sulfate solutions, such as aluminum sulfate (($Al_2SO_4$)$_3 \cdot 14H_2O$) solutions, commonly known and referred to as "alum," have long been used to remove color and suspended particles, as well as organic and microbiological contaminants from water. Alum is readily available and when diluted with surface water, it can function as a coagulant, flocculent, precipitant and emulsion breaker. As a coagulant, alum removes the primary nutrient for blue-green algae in the water. This function is important because these algae remove oxygen from the water (known as biochemical oxygen demand or BOD) and thus pose a danger to fish. Alum also forms an insoluble precipitate or floccule, i.e., a floc, with the impurities in the water. The floc grows in size as it attracts suspended and colloidal particles and organic compounds present in the water. The floc settles out of the water over time and can be removed by techniques that are well known to those skilled in the art such as by decanting or filtration.

One of the most difficult problems in water pollution control is the growth of algae. As noted above, algal organisms exert a BOD on the water and the algal BOD can often exceed the oxygen resources of the water. Algal growths can also cause unpleasant tastes and odors in water supplies. Dissolved phosphorus provide algae with a necessary nutrient supply. If the phosphorus supply could be removed the algae would not survive or flourish in the water column and a water pollution control problem would be addressed. An additional difficulty associated with the treatment of phosphorus in water is that the majority of the phosphorus (50–90%) is concentrated at the sediment-water interface of an impoundment and current application techniques involving alum primarily treat the phosphorus closer to the surface of the body of water. In addition, current techniques have been focused on nearly instantaneous sorption of phosphorus. As a result, the body of existing products and techniques do not perform as effectively in a number of water systems, especially high energy and deep systems, and in systems that require more than just instantaneous phosphorus sorption. In the former case, alum is flushed from the target waters before it can perform. In the latter case, the alum is poorly utilized in application. Also, the alum can leave an unwanted white cloud in the water for an extended period of time.

Therefore, there is a need for simple compositions, forms and methods for treating phosphorus impoundments in bodies of water.

DETAILED DESCRIPTION

According to one embodiment, a phosphorus impoundment is treated with a composition that includes alum and a member of the smectite family of minerals as the two major components. As used herein the term "alum" shall refer to and be defined to mean aluminum sulfate (($Al_2SO_4$)$_3 \cdot 14H_2O$). Also, as used herein the term "smectite mineral material" shall refer to and be defined to mean bentonite, attapulgite, saponite, hectorite, sepiolite and fullers earth. Bentonite is a smectite bearing ore that is enriched in the smectite mineral known as montmorillonite. Preferably, the composition includes from about 30 to about 99 weight percent of alum and from about 1 to about 70 weight percent of a smectite mineral material.

According to a preferred embodiment, the composition includes a pH buffering agent which shall be referred to herein as a "buffer." Preferably, the buffer is a common, widely available pH buffering agent such as sodium carbonate ($Na_2CO_3$), sodium bicarbonate ($NaHCO_3$), calcium carbonate ($CaCO_3$), magnesium carbonate ($MgCO_3$), calcium hydroxide ($Ca(OH)_2$), magnesium hydroxide ($Mg(OH)_2$), sodium hydroxide (NaOH), magnesium oxide (MgO) and calcium oxide (lime) (CaO) According to this embodiment, the composition includes from 0 to about 30 weight percent of a buffer.

According to another preferred embodiment, the composition includes an algaecide. Preferably the algaecide includes a common, widely available copper based system such as copper sulfate ($CuSO_4$) or one of its various hydrous varieties such as copper sulfate pentahydrate ($CuSO_4 \cdot 5H_2O$) In addition, the algaecide may include chelated copper-based systems such as alkylated amines, preferably having an alkyl chain of from 6 to 30 carbon atoms, especially di-tallo di-bromo copper amines, preferably having from 14 to 18 carbon atoms, as well as, sodium and potassium salts of such alkylated amines. According to this embodiment, the composition includes from 0 to about 20 weight percent of an algaecide.

According to another preferred embodiment, the composition includes alum, a smectite mineral material, a buffer and an algaecide. According to this embodiment the components of the composition are present at the weight percentages noted above.

According to another preferred embodiment, the components of the composition (alum, a smectite mineral material, a buffer (if present) and an algaecide (if present)) are covered or coated by techniques well known to those skilled in the art, with one or more natural organic by-products such as corn starch, sugar-based resins, and various natural product derivatives such as chemical families of resins and starches. Suitable resins and coatings include guar gum, alginates, polyvinyl alcohol, partially hydrolyzed polyacrylamides and other similar polymers well known to those skilled in the art. According to this embodiment, the composition includes from 0 to about 5 weight percent of natural water soluble resins and by-products as a coating.

According to another preferred embodiment, the components of the composition (alum, a smectite mineral material and a buffer (if present)) are covered or coated by techniques well known to those skilled in the art, with an algaecide. Suitable algaecide materials and the preferred concentrations thereof are noted above.

The compositions of these embodiments selectively remove phosphorus from natural and man-made water systems. Phosphorus is a primary nutrient for aquatic flora/fauna such as blue-green algae which produce unsightly green slimes and clouds, and undesirable odors in waters. By removing the phosphorus, the algae are deprived of nourishment and therefore do not proliferate in the water column.

Each component of the compositions of the present embodiments, serves a function in the product towards the goal of optimal sorption and thus removal of phosphorus. Alum is a water treatment product that is used to remove phosphorus and other compounds such as dissolved organics, suspended sediment, and metals from a body of water. The primary purpose of the alum is to sorb the phosphorus from the water or sediments. Alum is generally commercially available from General Chemical Corporation.

The smectite mineral material, preferably bentonite, functions to 1) optimize the timing of the dissolution of the composition in the water column, 2) buffer the pH of the water that is being treated to a neutral pH level, and 3) optimize or control the density of the composition to more precisely estimate the residence time in the water column. Bentonite is generally commercially available from Bentonite Performance Minerals.

In addition to buffering the pH of the body of water, the buffer also enhances the density of the compositions for use in higher energy—higher flow—water systems. The buffers are generally commercially available from The General Chemical Group, Inc., Vulcan Materials Company, Franklin Limestone, Imerys, S. A. and Omya AG.

The algaecides are generally commercially available from Earth Tech, Inc. and Applied Biochemists.

The compositions of the embodiments discussed above generally retain approximately 90% of their integrity or shape for up to approximately 2 minutes. The compositions of the embodiments discussed above that have been coated with the materials discussed above, dissolve in water at a much slower rate than uncoated compositions. Specifically, the coated compositions generally retain approximately 90% of their integrity or shape for up to approximately 24 hours.

The compositions of the present embodiments are manufactured and produced according to techniques well known to those skilled in the art. Preferably, the compositions of the present embodiments are produced in a variety of physical forms that are designed to enhance delivery of the compositions to a desired location in a body of water such as spheres to oblate spheroids, cylinders to cubes and three-dimensional rectangles ranging in size from ¼" to 24" in diameter. More preferably, the compositions of the present embodiments are produced in the form of tablets, pellets, extruded noodles, briquettes or ribbons by equipment well known to those skilled in the art such as extruders, tabletizers, briquetters or agglomerators. In the process of forming such tablets, extruded noodles, briquettes or ribbons, each component of the compositions are provided in powdered or granular form and the components are blended. Preferably, the raw material components are blended in the proportions noted above and are physically mixed at the desired levels in tanks or similar units of 20 to 200 ton capacity, by augers and paddles for a prescribed amount of time, preferably from 5 minutes to up to 6 hours in batch mode, or by continuous metered feed onto a common belt or in a common continuously producing extruder, pelletizer, tabletizer, or agglomerator. For instance, a typical extruder is in the form of an elongated rectangular tub with at least one and optionally two augers oriented parallel to the ground that physically mixes the materials into a uniform mixture of the composition and then passes the composition through a restricted opening to form elongated noodles or cylindrical pellets. Conventional tabletizers and pelletizers take the mixed materials from a storage tank and compress the mixture via converging die plates into forms on the order of ¼" to 1" diameter spheres and spheroids. Commercial agglomerators take the mixtures as a powder (having a particle size ranging from 44 $\mu$m to 100 $\mu$m) and non-compressively combines the mixture into spheroids. Preferably, the composition has a moisture content of from 1 to 15 percent by weight. Preferably, the compositions manufactured according to the above mentioned processes may be coated with the materials discussed above according to techniques well known to those skilled in the art. Those skilled in the art will also recognize that other well known techniques may also be utilized to manufacture the compositions of the present embodiment.

The compositions of the present embodiments have utility in the following water treatment markets: municipal water treatment polishing agent, commercial construction/engineering, agricultural feedstock (such as in piggeries, cattle, sheep and ostrich farms), aquaculture (fish farms and hatcheries, such as for shrimp, salmon and trout), natural lake and river systems and watersheds, recreational and leisure (golf course ponds, amusement parks and aquatic centers), industrial effluent management, and mining and exploration (tailings ponds and discharge systems).

The compositions of the present embodiments, are time release alum-based sorbents of phosphorus in water. The vast majority of phosphorus-laden water systems contain a minority of suspended or dissolved phosphorus in the water column as compared to the sediment water interface. As used herein, the term "sediment water interface" shall refer to and be defined to mean an area in a body of water that generally includes the top six inches of sediment combined with the deepest six inches of water. In the vast majority of water systems such as lakes, rivers, ponds or trenches, the majority of the total phosphorus is located at the sediment water interface. Powdered alum tends to remain in suspension removing the suspended phosphorus, organic matter, and other sediment but rarely reaches the targeted problem area in need of such treatment. Preferably the density of individual forms of the compositions of the present embodiment ranges from about 1.0 to about 2.0 gm/cm$^3$. It is also preferred that the individual forms of the compositions of the present embodiments have a diameter or major axis that ranges from ¼" to 24". Most preferably, the compositions of the present embodiments have a density and size such that the compositions settle quickly through the water column arriving where they are needed most at the sediment water interface.

The calculation for settling in water systems is based upon Stokes Settling Law which describes the rate of settling of a particle based upon the density of the particle and the density of the water. Stokes Settling Law is an accepted scientific principle used in a number of industries and can be used to estimate settling distances and time parameters for the compositions of the present embodiments. As noted above, the uncoated compositions according to the present embodiments will retain approximately 90% of their particle integrity for about 2 minutes which translates to a minimum of 50 feet of water column at the percentages of alum and smectite mineral material indicated above.

In commercial terms, the average depth of the water columns needing to be cleaned up is about 6', so according to Stokes Law, the uncoated product will reach the sediment water interface well in advance of the onset of significant dissolution.

Variations and Equivalents

Although only a few exemplary embodiments have been described in detail above, those skilled in the art will readily appreciate that many other modifications are possible in the exemplary embodiments without materially departing from the novel teachings and advantages described herein. Accordingly, all such modifications are intended to be included within the scope of the following claims.

What is claimed is:

1. A method of treating phosphate in a body of water comprising:

adding to the body of water a time release sorbent composition comprising alum, a smectite mineral material and an algaecide; and releasing alum from the composition to sorb said phosphate from the water which release of alum is caused by dissolution of the composition as the composition passes through the body of water.

2. A method according to claim 1, wherein the smectite mineral material is selected from the group consisting of: bentonite, attapulgite, saponite, hectorite, sepiolite and fullers earth.

3. A method according to claim 1, wherein the composition is in a form that enhances delivery of the composition to a desired location in the body of water.

4. A method according to claim 3, wherein the composition is in a form selected from the group consisting of a tablet, extruded noodle, pellet, briquette or ribbon.

5. A method according to claim 1, wherein the composition retains about 90 percent of the integrity of its form for up to about 2 minutes from the time the composition is added to the body of water.

6. A method according to claim 1, wherein the composition further comprises a buffer.

7. A method according to claim 6, wherein the buffer is selected from the group consisting of sodium carbonate, sodium bicarbonate, calcium carbonate, magnesium carbonate, calcium hydroxide, magnesium hydroxide, sodium hydroxide, magnesium oxide and calcium oxide.

8. A method according to claim 6, wherein the composition further comprises a coating.

9. A method according to claim 8, wherein the algaecide is in the coating.

10. A method according to claim 6, wherein the composition is coated with a water soluble resin material selected from corn starch, guar gum, alginates, polyvinyl alcohol and partially hydrolyzed polyacrylamides.

11. A method according to claim 10, wherein the composition retains about 90 percent of the integrity of its form for up to about 24 hours from the time the composition is added to the body of water.

12. A method according to claim 6, wherein the composition retains about 90 percent of the integrity of its form for up to about 2 minutes from the time the composition is added to the body of water.

13. A method according to claim 1, wherein the composition further comprises a coating.

14. A method according to claim 13, wherein the algaecide is in the coating.

15. A method according to claim 1, wherein the algaecide is selected from the group consisting of a copper based system, a chelated copper-based system, an alkylated amine and sodium and potassium salts thereof.

16. A method according to claim 15, wherein the copper based system includes copper sulfate or a hydrous derivative thereof.

17. A method according to claim 16, wherein the copper based system includes copper sulfate pentahydrate.

18. A method according to claim 15, wherein the chelated copper-based system comprises di-tallo di-bromo copper amine.

19. A method according to claim 1, wherein the composition is coated with a water soluble resin material selected from corn starch, guar gum, alginates, polyvinyl alcohol and partially hydrolyzed polyacrylamides.

20. A method according to claim 19, wherein the composition retains about 90 percent of the integrity of its form for up to about 24 hours from the time the composition is added to the body of water.

21. A method according to claim 1, wherein the composition in the form of a tablet, extruded noodle, pellet, briquette or ribbon, has a diameter or major axis of from ¼ to 24 inches.

22. A method according to claim 1, wherein the composition in the form of a tablet, extruded noodle, pellet, briquette or ribbon, has a density of from 1.0 to 2.0 $gm/cm^3$.

23. A method of treating a phosphate in a body of water comprising:

adding to the body of water a time release sorbent composition comprising alum, a smectite mineral material and an algaecide; and delivering the composition to a sediment water interface to sorb said phosphate from the sediment, whereby alum is released from the composition at the sediment water interface.

24. A method according to claim 23, wherein the smectite mineral material is selected from the group consisting of: bentonite, attapulgite, saponite, hectorite, sepiolite and fullers earth.

25. A method according to claim 23, wherein the composition is in a form that enhances delivery of the composition to a desired location in the body of water.

26. A method according to claim 25, wherein the composition is in a form selected from the group consisting of a tablet, extruded noodle, pellet, briquette or ribbon.

27. A method according to claim 23, wherein the composition retains about 90 percent of the integrity of its form for up to about 2 minutes from the time the composition is added to the body of water.

28. A method according to claim 23, wherein the composition further comprises a buffer.

29. A method according to claim 28, wherein the buffer is selected from the group consisting of sodium carbonate, sodium bicarbonate, calcium carbonate, magnesium carbonate, calcium hydroxide, magnesium hydroxide, sodium hydroxide, magnesium oxide and calcium oxide.

30. A method according to claim 28, wherein the composition further comprises a coating.

31. A method according to claim 30, wherein the algaecide is in the coating.

32. A method according to claim 28, wherein the composition is coated with a water soluble resin material selected from corn starch, guar gum, alginates, polyvinyl alcohol and partially hydrolyzed polyacrylamides.

33. A method according to claim 32, wherein the composition retains about 90 percent of the integrity of its form for up to about 24 hours from the time the composition is added to the body of water.

34. A method according to claim 28, wherein the composition retains about 90 percent of the integrity of its form for up to about 2 minutes from the time the composition is added to the body of water.

35. A method according to claim 23, wherein the composition further comprises a coating.

36. A method according to claim 35, wherein the algaecide is in the coating.

37. A method according to claim 23, wherein the algaecide is selected from the group consisting of a copper based system, a chelated copper-based system, an alkylated amine and sodium and potassium salts thereof.

38. A method according to claim 37, wherein the copper based system includes copper sulfate or a hydrous derivative thereof.

39. A method according to claim 38, wherein the copper based system includes copper sulfate pentahydrate.

40. A method according to claim 37, wherein the chelated copper-based system comprises di-tallo di-bromo copper amine.

41. A method according to claim 23, wherein the composition is coated with a water soluble resin material selected from corn starch, guar gum, alginates, polyvinyl alcohol and partially hydrolyzed polyacrylamides.

42. A method according to claim 41, wherein the composition retains about 90 percent of the integrity of its form for up to about 24 hours from the time the composition is added to the body of water.

43. A method according to claim 23, wherein the composition in the form of a tablet, extruded noodle, pellet, briquette or ribbon, has a diameter or major axis of from ¼ to 24 inches.

44. A method according to claim 23, wherein the composition in the form of a tablet, extruded noodle, pellet, briquette or ribbon, has a density of from 1.0 to 2.0 gm/cm$^3$.

* * * * *